US012033780B2

(12) United States Patent
Saitoh

(10) Patent No.: US 12,033,780 B2
(45) Date of Patent: Jul. 9, 2024

(54) COOLING STRUCTURE FOR TRANSFORMER

(71) Applicant: TMEIC Corporation, Chuo-ku (JP)

(72) Inventor: Shunetsu Saitoh, Tokyo (JP)

(73) Assignee: TMEIC Corporation, Chuo-ku (JP)

( * ) Notice: Subject to any disclaimer, the term of this patent is extended or adjusted under 35 U.S.C. 154(b) by 591 days.

(21) Appl. No.: 17/251,472

(22) PCT Filed: Apr. 22, 2019

(86) PCT No.: PCT/JP2019/017012
§ 371 (c)(1),
(2) Date: Dec. 11, 2020

(87) PCT Pub. No.: WO2020/217274
PCT Pub. Date: Oct. 29, 2020

(65) Prior Publication Data

US 2021/0110957 A1 Apr. 15, 2021

(51) Int. Cl.
*H01F 27/20* (2006.01)
*H01F 27/08* (2006.01)
*H01F 27/28* (2006.01)

(52) U.S. Cl.
CPC ......... *H01F 27/20* (2013.01); *H01F 27/2876* (2013.01)

(58) Field of Classification Search
CPC .... H01F 27/20; H01F 27/2876; H01F 27/322; H01F 27/085
See application file for complete search history.

(56) References Cited

U.S. PATENT DOCUMENTS 2,912,658 A * 11/1959 Paluev .................. H01F 27/322 336/60
3,659,239 A * 4/1972 Marton ................... H01F 27/22 336/60
4,000,482 A * 12/1976 Staub .................... H01F 27/322 336/60

FOREIGN PATENT DOCUMENTS

JP 62-149815 U 9/1987
JP 9-162040 A 6/1997
JP 2011071190 A * 4/2011
JP 2012-50269 A 3/2012
JP 2018-82026 A 5/2018

OTHER PUBLICATIONS

International Search Report issued Jul. 9, 2019 in PCT/JP2019/017012 filed Apr. 22, 2019, 1 page.

* cited by examiner

*Primary Examiner* — Tuyen T Nguyen
(74) *Attorney, Agent, or Firm* — Oblon, McClelland, Maier & Neustadt, L.L.P.

(57) ABSTRACT

A cooling structure for a transformer according to an embodiment includes a coil and a partition member. The partition member covers the coil along the axial direction on the downstream side in the flow direction of the refrigerant that flows along the axial direction parallel to the center axis of the coil.

3 Claims, 2 Drawing Sheets

COOLING STRUCTURE FOR TRANSFORMER

TECHNICAL FIELD

The present invention relates to a cooling structure for a transformer.

BACKGROUND ART

Conventionally, a cooling structure that circulates cooling air along an axial direction of a three-phase coil of a reactor has been disclosed (for example, see Patent Document 1).

Also, conventionally, a cooling device that cools the three-phase coil of the transformer housed inside the housing by circulating cooling air inside the housing between the intake port and the exhaust port provided in the housing is disclosed (for example, see Patent Document 2). In this cooling device, the intake port of the housing is formed facing the lower portion of the three-phase coil of the transformer.

In the cooling structure and the cooling device according to the related art described above, it is desired to improve the cooling efficiency while suppressing an increase in the pressure loss of the cooling air in the coil.

PRIOR ART DOCUMENTS

Patent Document

[Patent Document 1]
Japanese Unexamined Patent Application, First Publication No. 2018-82026

[Patent Document 2]
Japanese Unexamined Patent Application, First Publication No. 2012-50269

SUMMARY OF INVENTION

Problems to be Solved by the Invention

The problem to be solved by the present invention is to provide a cooling structure for a transformer capable of suppressing an increase in refrigerant pressure loss and improving cooling efficiency.

Means for Solving the Problems

A cooling structure for a transformer according to an embodiment includes a coil and a partition member. The coil is formed around a central axis, and a plurality of coils are arranged along an axial direction parallel to the central axis. The partition member covers the coil along the axial direction on the downstream side from a center of the coil in the flow direction of the refrigerant that flows along the axial direction of the coil. An interval between two coils among the plurality of coils, which are located at an upstream side end of the partition member in the flow direction is greater than an interval between the other coils in the axial direction.

DESCRIPTION OF EMBODIMENTS

Hereinafter, a cooling structure of a transformer according to an embodiment will be described with reference to the accompanying drawings.

Figure 1:
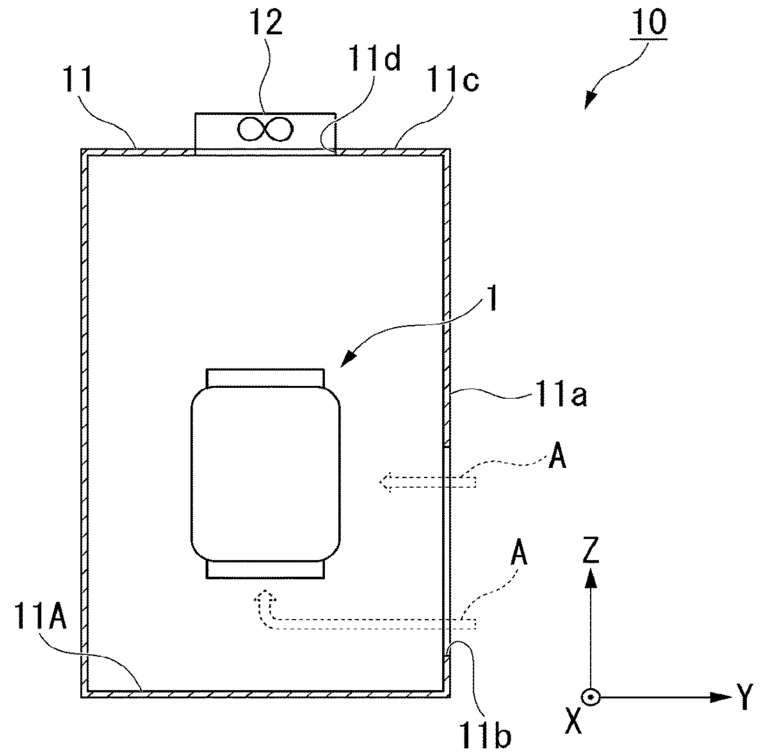
FIG. 1 is a configuration diagram of a cooling structure of a transformer according to an embodiment as viewed from an X-axis direction.
Figure 2:
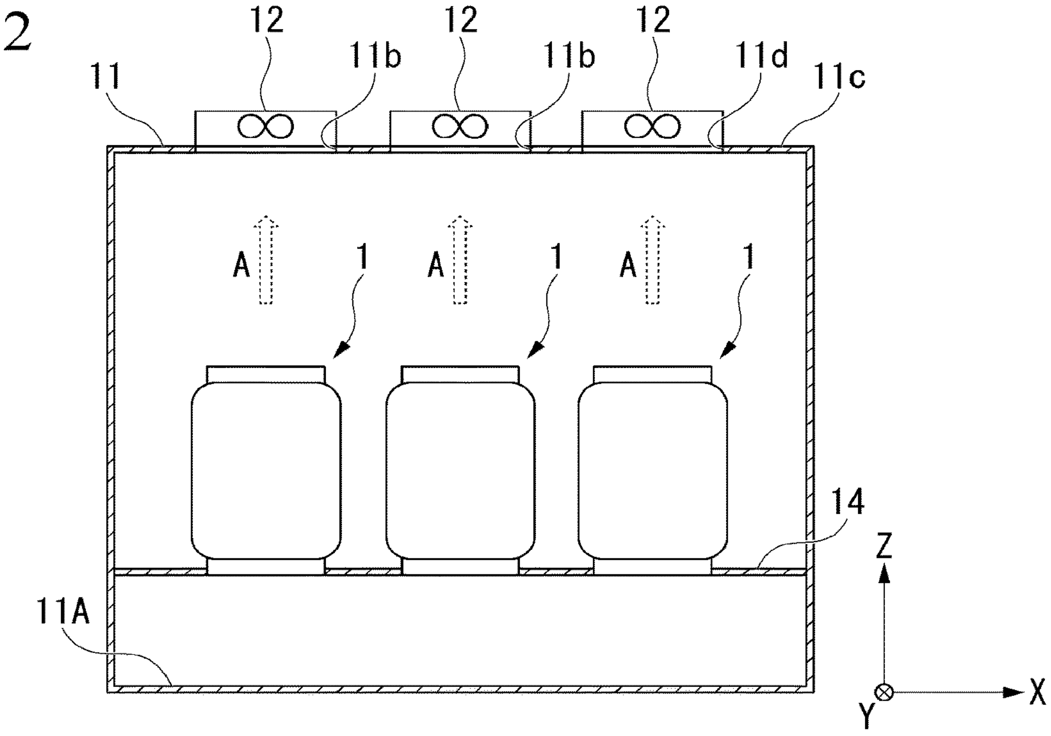
FIG. 2 is a configuration diagram of a cooling structure of the transformer according to the embodiment as viewed from a Y-axis direction.
Figure 3:
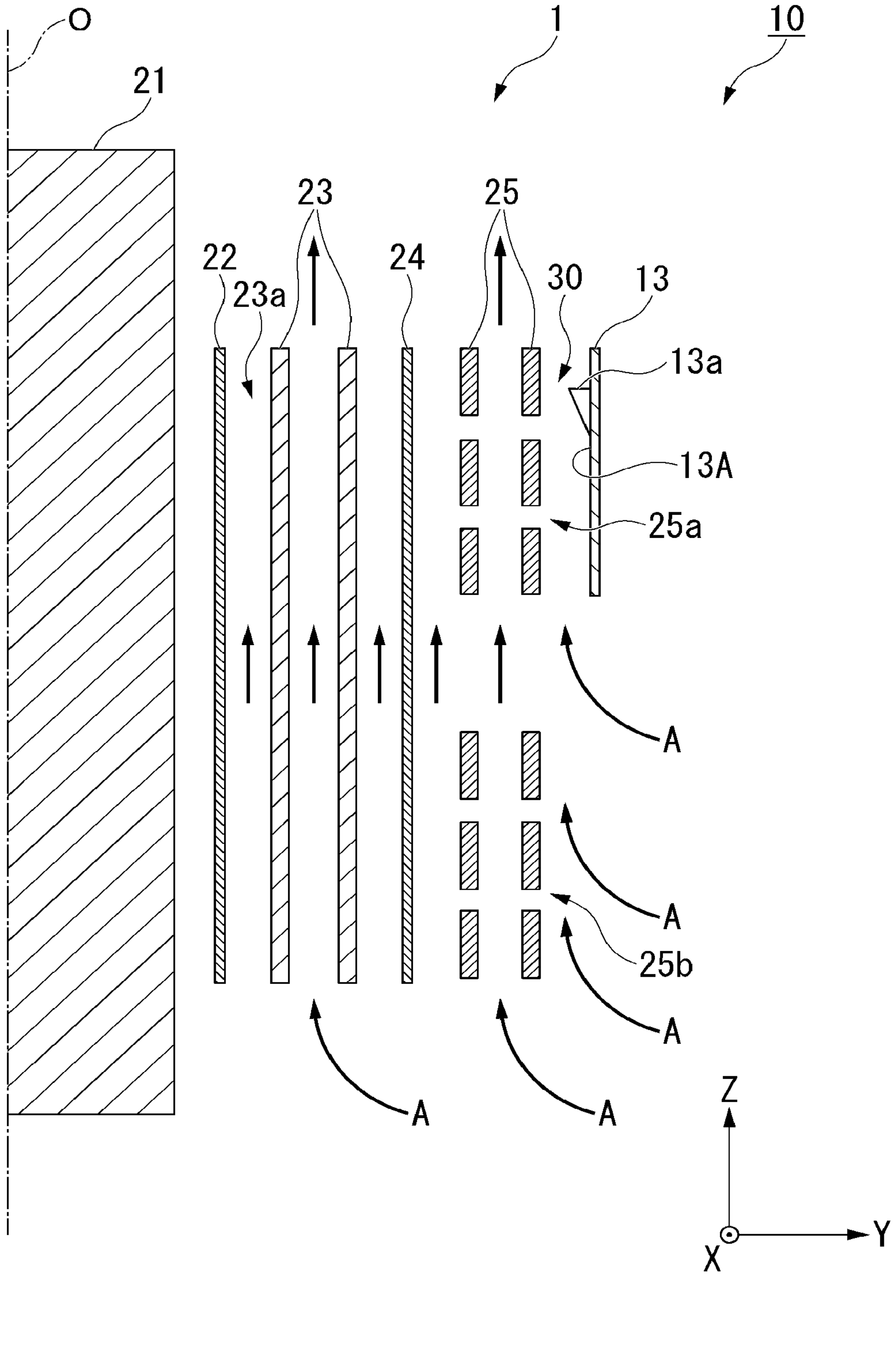
FIG. 3 is an enlarged configuration diagram of a cooling structure of the transformer according to the embodiment as viewed from the X-axis direction.

FIG. 1 is a configuration diagram of the cooling structure 10 of the transformer 1 according to the embodiment as viewed from the X-axis direction. FIG. 2 is a configuration diagram of the cooling structure 10 of the transformer 1 according to the embodiment as viewed from the Y-axis direction. FIG. 3 is an enlarged configuration diagram of the cooling structure 10 of the transformer 1 according to the embodiment as viewed from the X-axis direction.

In the following, the X-axis, Y-axis, and Z-axis directions orthogonal to each other in a three-dimensional space are directions parallel to the respective axes. For example, the left-right direction of the transformer 1 is parallel to the X-axis direction. The positive direction in the X-axis direction is a direction from the right side to the left side of the transformer 1. The front-back direction of the transformer 1 is parallel to the Y-axis direction. The positive direction in the Y-axis direction is a direction from the front to the rear of the transformer 1. The vertical direction of the transformer 1 is parallel to the Z-axis direction. The positive direction in the Z-axis direction is a direction from the lower portion to the upper portion of the transformer 1.

As shown in FIGS. 1, 2, and 3, the cooling structure 10 of the transformer 1 according to the embodiment includes a housing 11, a plurality of fans 12, and a partition member 13.

The housing 11 houses the plurality of transformers 1 therein. The plurality of transformers 1 are, for example, three-phase transformers 1 of a U phase, a V phase, and a W phase. The three-phase transformers 1 are arranged in the housing 11 in a direction parallel to the X-Y plane. The housing 11 includes, for example, a support member 14 that supports the plurality of transformers 1 at a predetermined distance from a bottom surface 11A of the housing 11. The support member 14 is formed, for example, so as to allow a refrigerant such as air A flowing from outside the housing 11 to pass therethrough.

Each transformer 1 includes an iron core 21, a first insulating member 22, a primary coil (corresponding to a first coil in the claim 23, a second insulating member 24, and a secondary coil (corresponding to a second coil in the claims). 25. The first insulating member 22, the primary coil 23, the second insulating member 24, and the secondary coil 25 are arranged in layers that are sequentially stacked concentrically with respect to the iron core 21 from the inner peripheral side to the outer peripheral side in the radial direction.

An intake port 11*b* is formed in the side portion 11*a* of the housing 11 so as to face the plurality of transformers 1 in the Y-axis direction. A plurality of exhaust ports 11*d* penetrating in the Z-axis direction are formed in an upper portion 11*c* of the housing 11.

The plurality of fans 12 are fixed to an upper portion 11*c* of the housing 11. Each fan 12 exhausts the refrigerant (for example, cooling air A or the like), which is drawn into the housing 11 from the intake port 11*b*, to the outside of the housing 11 from the exhaust port 11*d*. The refrigerant, which flows into the inside of the housing 11 from the intake port 11*b*, flows toward the lower portion or the side portion of each transformer 1. The refrigerant inside the housing 11 flows to the outside from the exhaust port 11*d* via each transformer 1 in the Z-axis direction.

The partition member 13 covers the secondary coil 25 from the outer peripheral side along the axial direction of the central axis O of each transformer 1 on the downstream side in the flow direction of the refrigerant which flows through each transformer 1. The outer shape of the partition member 13 is formed, for example, in a cylindrical shape. The partition member 13 is formed of, for example, an electrically insulating resin material.

The partition member 13 covers only the axially upper side region 25*a* of the secondary coil 25, which is arranged on the outer peripheral side of each transformer 1, from the outer peripheral side. The partition member 13 exposes the lower side region 25*b* in the axial direction of the secondary coil 25 so as to face the intake port 11*b* in a direction parallel to the X-Y plane. The direction parallel to the X-Y plane is, for example, the Y-axis direction. The partition member 13 forms an air tunnel 30 through which the refrigerant flows in the axial direction with respect to the upper side region 23*a* of the primary coil 23 and the upper side region 25*a* of the secondary coil 25 of each transformer 1.

The partition member 13 includes a protruding portion 13*a* that protrudes radially inward from the inner peripheral surface 13A toward the secondary coil 25. The protruding portion 13*a* allows the refrigerant to flow toward a portion of the transformer 1 where the temperature is relatively high. The portion having a relatively high temperature is, for example, a locally high-temperature portion, such as an upper portion of each of the secondary coil 25 and the primary coil 23.

The protruding portion 13*a* disturbs the flow of the refrigerant along the axial direction inside the wind tunnel 30. The protruding portion 13*a* increases the cooling efficiency of a desired portion by the refrigerant by disturbing the flow of the refrigerant.

As described above, according to the cooling structure 10 of the transformer 1 of the embodiment, the partition member 13 covers the upper side region 25*a* on the downstream side of the secondary coil 25 in the flow direction of the refrigerant, and exposes the lower side region 25*b*. The length of the wind tunnel 30 in the axial direction is formed to be shorter compared to a case where, for example, the wind tunnel is formed so as to cover the entire area of the secondary coil 25 in the axial direction, so that the pressure loss of the refrigerant can be reduced. It is possible to suppress a decrease in the cooling efficiency in the upper side region 25*a* due to the pressure loss of the refrigerant, and to secure a desired cooling efficiency in the upper side region 25*a* that tends to have a higher temperature than the lower side region 25*b*. It is possible to suppress an increase in the output of the fan 12 required to secure the desired flow amount and flow velocity of the refrigerant, and to reduce the size of the fan 12.

The lower side region 25*b* of the secondary coil 25 that is exposed without being covered by the partition member 13 is cooled by the refrigerant that flows from another direction in addition to the axial direction. Since the lower side region 25*b* is not covered by the partition member 13, the cooling efficiency can be improved while suppressing an increase in pressure loss of the refrigerant. The upper side region 25*a* of the secondary coil 25 accommodated in the wind tunnel 30 formed by the partition member 13 is cooled by the refrigerant whose flow velocity is relatively increased by the wind tunnel 30. For example, even when the temperature of the refrigerant that flows from the lower side region 25*b* to the upper side region 25*a* along the axial direction gradually increases, the desired cooling efficiency in the upper side region 25*a* can be ensured by increasing the flow velocity.

By exposing the lower side region 25*b* of the secondary coil 25 by the partition member 13, for example, it is possible to suppress troublesome labor when attaching a temperature sensor or the like to each of the coils 23, 25, and it is possible to improve the efficiency of the mounting work of the sensor and the like.

By providing the protruding portion 13*a* protruding from the partition member 13 toward the secondary coil 25, the flow of the refrigerant along the axial direction inside the wind tunnel 30 can be disturbed. By disturbing the flow of the refrigerant, it is possible to improve the cooling efficiency of the refrigerant for a desired portion such as the upper portion of the secondary coil 25 and the primary coil 23.

Hereinafter, a modification of the embodiment will be described.

In the embodiment described above, each of the plurality of transformers 1 includes the iron core 21 provided independently, but it is not limited thereto. For example, the coils 23 and 25 may be mounted on a plurality of iron cores 21 formed integrally.

According to at least one embodiment described above, the partition member 13 covers the upper side region 25*a* on the downstream side of the secondary coil 25 in the refrigerant flow direction, and exposes the lower side region 25*b*. The pressure loss of the refrigerant can be reduced by forming the length of the wind tunnel 30 in the axial direction to be shorter compared to a case where, for example, the wind tunnel is formed so as to cover the entire area of the secondary coil 25 in the axial direction. It is possible to suppress a decrease in the cooling efficiency in the upper side region 25*a* due to the pressure loss of the refrigerant, and to secure a desired cooling efficiency in the upper side region 25*a* that tends to have a higher temperature than the lower side region 25*b*. It is possible to suppress an increase in the output of the fan 12 required to secure the desired flow amount and flow velocity of the refrigerant, and to reduce the size of the fan 12.

The lower side region 25*b* of the secondary coil 25 that is exposed without being covered by the partition member 13 is cooled by the refrigerant that flows from another direction in addition to the axial direction. Since the lower side region 25*b* is not covered by the partition member 13, the cooling efficiency can be improved while suppressing an increase in pressure loss of the refrigerant. The upper side region 25*a* of the secondary coil 25 accommodated in the wind tunnel 30 formed by the partition member 13 is cooled by the refrigerant whose flow velocity is relatively increased by the wind tunnel 30. For example, even when the temperature of the refrigerant that flows from the lower side region 25*b* to the upper side region 25*a* along the axial direction gradually increases, the desired cooling efficiency in the upper region 25*a* can be ensured by increasing the flow velocity.

By exposing the lower side region 25*b* of the secondary coil 25 by the partition member 13, for example, it is possible to suppress troublesome labor when attaching a temperature sensor or the like to each of the coils 23, 25, and to improve the efficiency of the mounting work of the sensor and the like.

By providing the protruding portion 13*a* protruding from the partition member 13 toward the secondary coil 25, the flow of the refrigerant along the axial direction inside the wind tunnel 30 can be disturbed. By disturbing the flow of the refrigerant, it is possible to improve the cooling efficiency of the refrigerant for a desired portion such as the upper portion of the secondary coil 25 and the primary coil 23.

Although several embodiments of the present invention have been described, these embodiments are provided by way of example and are not intended to limit the scope of the invention. These embodiments can be implemented in other various forms, and various omissions, replacements, and changes can be made without departing from the spirit of the invention. These embodiments and their modifications are included in the scope and gist of the invention, and are also included in the invention described in the claims and equivalents thereof.

REFERENCE SIGNS LIST

1: Transformer, 10: Cooling structure, 11: Housing, 12: Fan, 13: Partition member, 13*a*: Protruding portion, 21: Iron core, 22: First insulating member (Insulating member), 23: Primary coil (Coil, First coil), 24: Second insulating member (Insulating member), 25: Secondary coil (Coil, Second coil), 0: Central axis

The invention claimed is:

1. A cooling structure for a transformer comprising:

a plurality of coils formed around a central axis and arranged along an axial direction parallel to the central axis; and a partition member configured to cover at least one of the plurality of coils along the axial direction only on a downstream side from a center of the plurality of coils in a flow direction of a refrigerant that flows along the axial direction of the plurality of coils, wherein a first interval in the axial direction between two coils among the plurality of coils, which are located at an upstream side end of the partition member in the flow direction, is greater than a second interval in the axial direction between other coils.

2. The cooling structure for a transformer according to claim 1, further comprising:

a protruding portion configured to protrude from a surface of the partition member toward the at least one of the plurality of coils.

3. The cooling structure for a transformer according to claim 1, wherein the cooling structure further includes an inner coil disposed on an inner peripheral side than the plurality of coils which are disposed on an outer peripheral side, and an insulating member disposed between the plurality of coils and the inner coil.

* * * * *